United States Patent [19]
Bornhoffer

[11] 3,924,661
[45] Dec. 9, 1975

[54] FLEXIBLE HOSE STORAGE CONTAINER

[76] Inventor: Frank G. Bornhoffer, 79 Esteban Drive, Milford, Ohio 45150

[22] Filed: July 16, 1973

[21] Appl. No.: 379,354

[52] U.S. Cl. ............... 138/110; 206/446; 285/373; 285/419
[51] Int. Cl.² ......................................... F16L 57/00
[58] Field of Search ............ 138/110; 206/446, 481; 285/114, 373, 419

[56] References Cited
UNITED STATES PATENTS

| | | | |
|---|---|---|---|
| 1,435,311 | 11/1922 | Knight | 138/110 |
| 3,321,924 | 5/1967 | Liddell | 138/110 |
| 3,640,437 | 2/1972 | Galy | 206/446 |
| 3,672,709 | 6/1972 | Mueller | 285/419 |
| 3,741,252 | 6/1973 | Williams | 138/110 |
| 3,810,490 | 5/1974 | Ludwick | 138/106 |

*Primary Examiner*—William Price
*Assistant Examiner*—Bruce H. Bernstein
*Attorney, Agent, or Firm*—John G. Schenk

[57] ABSTRACT

A storage container for flexible hose holds the hose in its compressed condition. The storage container frictionally engages the hose to restrain the hose within the container.

3 Claims, 12 Drawing Figures

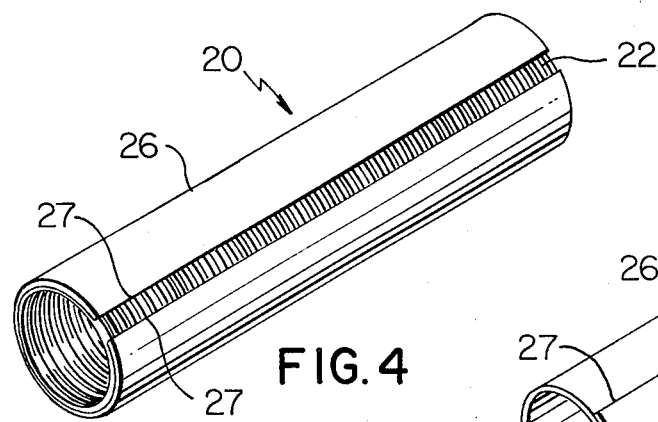
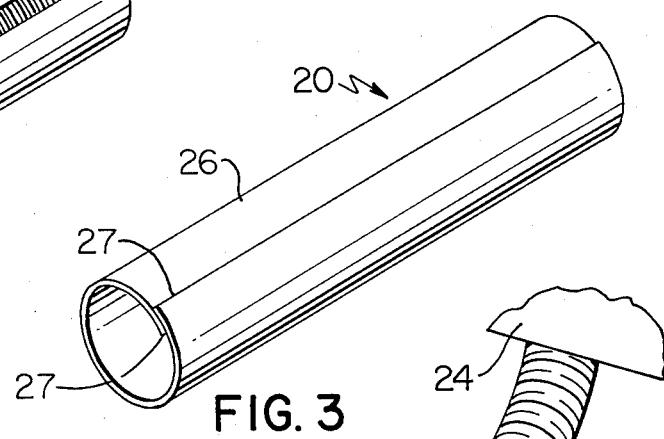
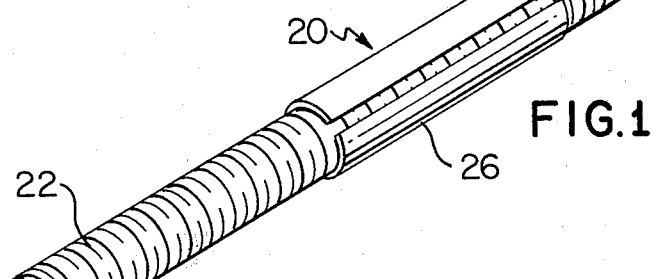
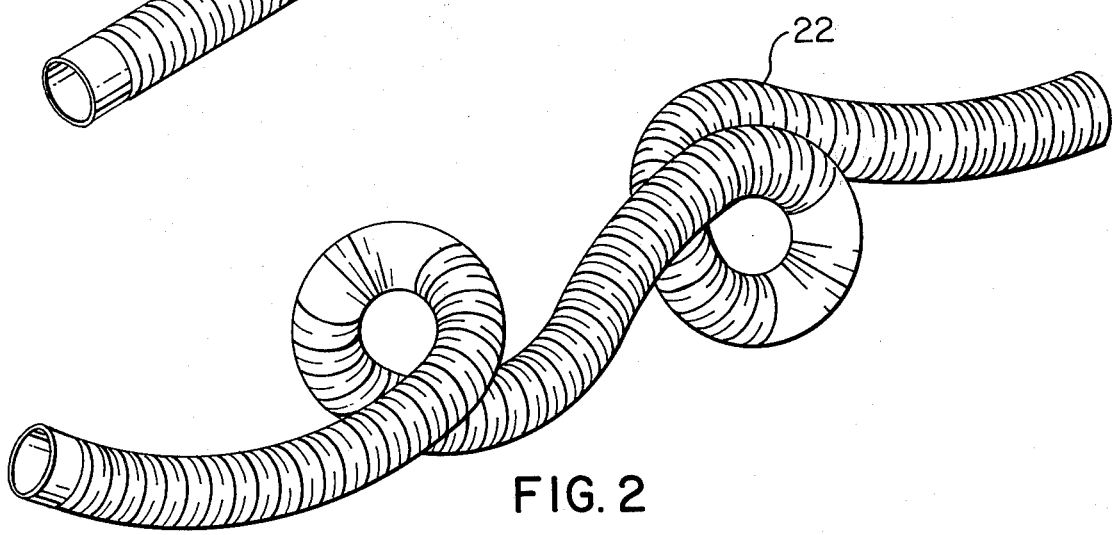

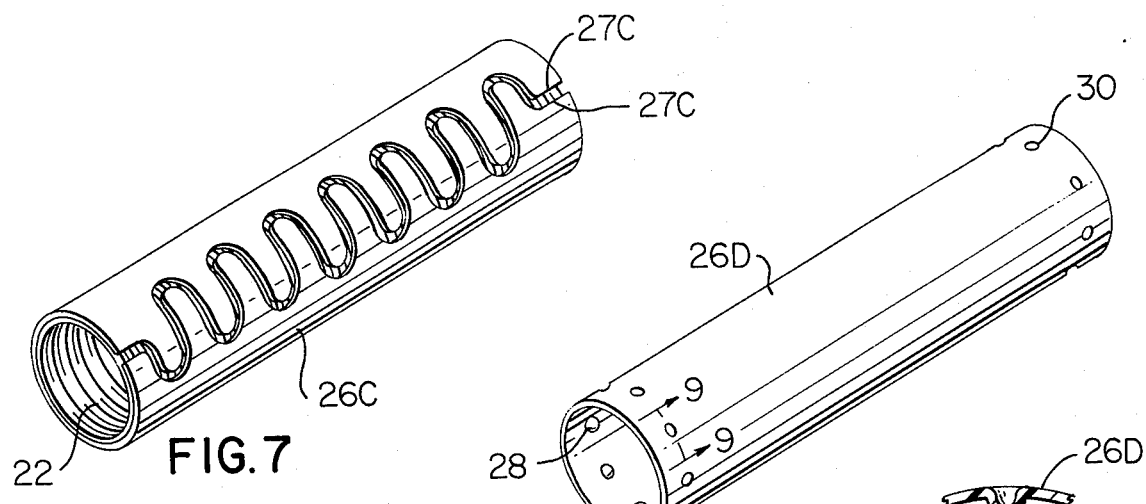
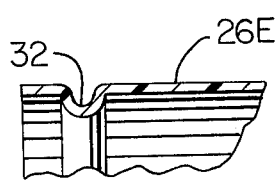
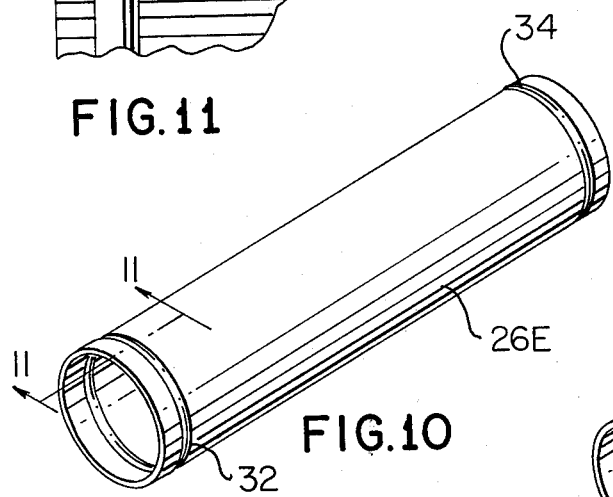
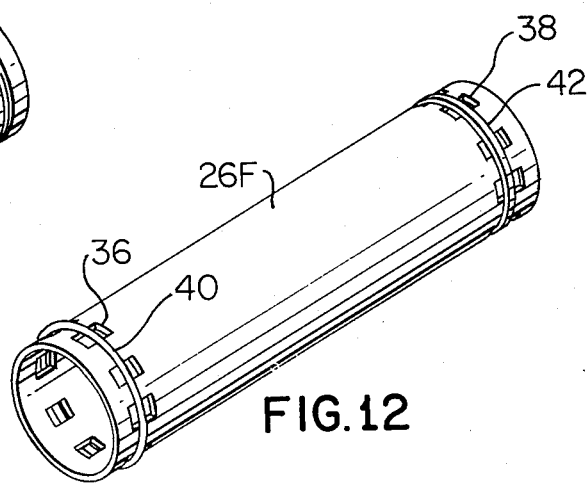
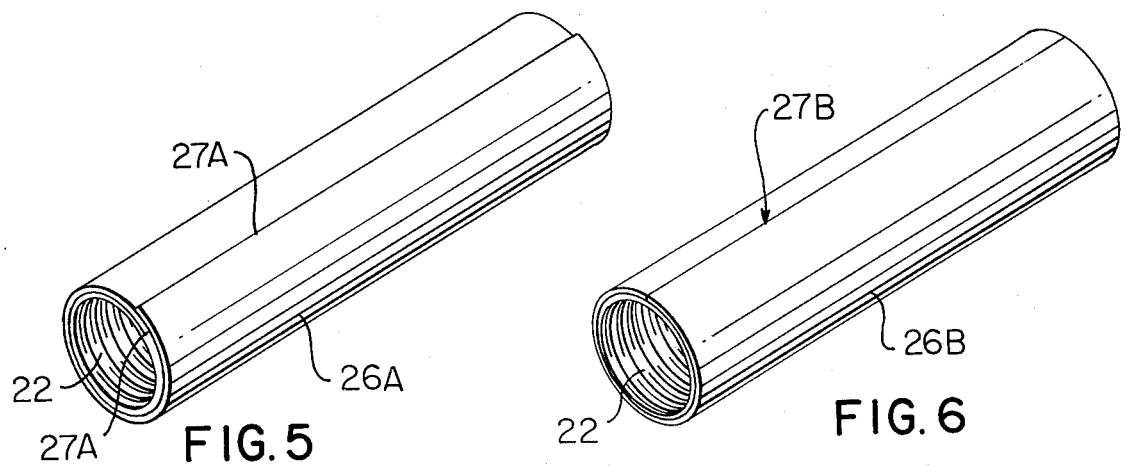

(1)

FLEXIBLE HOSE STORAGE CONTAINER

BACKGROUND OF THE INVENTION

This invention relates generally to storage container and more particularly to a storage container for housing a flexible hose.

It has long been a problem with users of flexible hose to have a convenient means to store the hose during periods of nonuse. Even during periods of use it is sometimes unwieldy to handle and keep the flexible hose properly aligned. An example of such flexible hose is the type used in recreational vehicles for connecting the vehicle waste drain with a ground sewer. The hose may oftentimes end up with bends and loops due to the excessive length of the hose. Such bends and loops are, of course, not conducive to proper drainage.

Accordingly, it is an object of this invention to provide a storage container which will store the flexible hose during periods of nonuse, yet will permit the exact amount of hose required to be withdrawn therefrom.

A further object of this invention is to provide a storage container which will protect the flexible hose from damage while stored in the container.

A still further object of this invention is to provide a storage container for flexible hose which will eliminate the bends and loops in the hose during use of the hose.

And yet another object of this invention is to provide a storage container which will hold the flexible hose in its compressed length during storage.

SUMMARY OF THE INVENTION

This invention provides an improved storage container for flexible hose. The container is of simple and economical construction, is easy to use and takes up a minimum of space while storing the hose therewithin. The storage container is an open-ended, cylindrical member having friction engaging surfaces to hold the flexible hose therein in the compressed stage.

Other objects, details, uses and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention in which:

FIG. 1 is a perspective view illustrating one exemplary embodiment of this invention showing the storage container in use with a flexible hose extending therefrom;

FIG. 2 is a view of a flexible hose without the storage container of this invention;

FIG. 3 is a view of the storage container of FIG. 1 with the flexible hose removed therefrom;

FIG. 4 shows a storage container of FIG. 3 with the flexible hose stored therein;

FIGS. 5, 6 and 7 show other exemplary embodiments of the storage container similar to that of FIG. 1;

FIG. 8 shows another exemplary embodiment of the storage container of this invention particularly showing different friction engaging means;

FIG. 9 is a view taken along line 9—9 of FIG. 8;

FIG. 10 is another exemplary embodiment of the storage container of this invention particularly illustrating a further friction engaging means;

FIG. 11 is a view taken along line 11—11 of FIG. 10; and

FIG. 12 is a view of another exemplary embodiment particularly showing another friction engaging means.

DESCRIPTION OF ILLUSTRATED EMBODIMENTS

Reference is now made to FIG. 1 of the drawings, which illustrates one exemplary embodiment of the improved storage container of this invention, which is designated generally by the reference numeral 20. A typical flexible hose of substantial length 22 protrudes from each end of the container 20, said hose being connected at one end to a recreational vehicle 24, for example. FIG. 2 illustrates the same flexible hose 22 in a typical position showing the numerous bends and loops along the length of the hose when such hose is not contained within a storage container 20.

Referring now particularly to FIGS. 3 and 4, the storage container 20 is seen to comprise an open-ended, cylindrical housing 26 of substantial shorter length than the expanded length of the flexible hose 22. The axial length of the housing 26 is slightly longer than the axial length of the flexible hose 22 when the hose is in the compressed state. The housing 26 may be made from any suitable semi-rigid material such as polyethylene plastic as is commonly used for making sewer pipe.

In the embodiment shown in FIGS. 3 and 4, the housing 26 is provided with an axial slit from one end to the other. The material has a natural compressive force radially inwardly such that the slit ends 27 of the housing 26 overlap one another (FIG. 3) when a hose is not held therein. As seen in FIG. 4, a hose 22 has been inserted into the container housing 26 such that the slit ends of the housing 26 are slightly separated. The compressive force of the housing 26 causes the inner surface of the housing 26 to frictionally engage the outer surface of the hose 22. Thus, the hose 22 is conveniently and safely stored in the compressed state within the housing 26. When it is desired to utilize the hose 22, it is only necessary to withdraw the required amount of hose needed at that particular time. The remainder of the hose 22 will remain in the compressed state within the housing 26 as seen in FIG. 1.

Additional exemplary embodiments of this invention will now be described with reference to FIGS. 5–12. The storage container illustrated in the additional embodiments are very similar to the storage container 20 having the open-ended cylindrical housing 26; therefore, such additional exemplary embodiments will be designated by the same reference numerals followed by letter designations and will not be described again.

In FIG. 5 the housing 26A is seen to have overlapping slit edges 27A even when the hose 22 is stored within the housing 26A. In this manner, the hose 22 is completely encased within the housing 26A and no part of the hose 22 is exposed. The compressive tendency of the housing 26A provides friction engaging means to hold the hose 22 securely therein.

Another illustrative embodiment is shown in FIG. 6 in which the slit ends 27B of housing 26B do not overlap but are in engagement one with the other when the hose 22 is stored therein. In this embodiment, it is necessary that the internal diameter of the housing 26B be properly sized relative to the outer diameter of the hose 22.

In FIG. 7 the housing 26C is provided with an irregular axial slit providing slit edges 27C. The slit edges 27C are complementally formed so as to provide greater protection for the hose 22 as the housing 26C is expanded.

Referring now to FIGS. 8 and 9 a storage container having an open-ended cylindrical housing 26D is shown. The cylindrical housing 26D is not formed with an axial slot therealong. Near each end of the housing 26D a plurality of indentations or detents 28 and 30 are formed. Each row of indentations is formed about the end in an annular pattern and projects radially inwardly as seen in FIG. 9. The respective detents 28 and 30 frictionally engage a hose which may be placed therein to securedly hold the hose relative to the housing 26D.

Another illustrative embodiment is shown in FIG. 10. The housing 26E is provided with an annular groove 32 and 34 formed near each end. The grooves 32 and 34, as seen in FIG. 11, project inwardly so as to frictionally engage a hose placed therein. The annular grooves 32 and 34 of FIG. 10 and the detents 28 and 30 of FIG. 8 provide internal restrictions near each end of the respective housing to cooperatively engage the flexible hoses placed therein.

Reference is now made to FIG. 12 which shows a cylindrical housing 26F. The housing 26F is formed with a plurality of axial slots 36 and 38 annularly spaced about the housing near each end thereof. Annular means 40 and 42, such as a wire ring or band, are placed respectively about the ends of the housing 26F so as to cooperate with the respective plurality of slots 36 and 38. The annular ring will cause a slight reduction in the diameter so as to frictionally engage a hose placed therein.

It may be noted that the internal diameter of the respective housings depend on the outer diameter of the hose which is to be stored. The axial length of the housing is substantially less than the expanded length of the flexible hose, yet is of sufficient length to completely house the hose in its compressed state. Accordingly, it can be seen that the storage container hereinabove described accomplishes the objectives hereinbefore set forth.

While present exemplary embodiments of this invention have been illustrated and described, it will be recognized that this invention may be otherwise variously embodied and practiced by those skilled in the art.

What is claimed is:

1. A storage container and flexible hose combination for lengths of flexible hose, said flexible hose having means for axially expanding and compressing to lengthen or shorten said hose, said container comprising an open-ended cylindrical housing of semi-rigid plastic material having an axial length substantially less than the expanded axial length of said flexible hose, said housing axial length being approximately as long as the compressed length of said flexible hose whereby substantially the entire length of compressed hose is enclosed and protected within said housing, said housing being formed with an axial separation from one end to the other thereby being radially expandable and contractable to accommodate hoses of different diameter, said axial separation forming a pair of linear edges in said housing, said housing defining an inner friction engaging surface for frictionally engaging said flexible hose therein, said housing constructed to cause said linear edges to tend to move toward each other thereby exerting a compressive force radially inwardly whereby said inner surface frictionally engages the outer peripheral surface of said hose such that maximum frictional engagement occurs when said hose is in a compressed condition within said housing.

2. The storage container as set forth in claim 1 in which said axial separation is in an axial direction thereby forming a pair of substantially axial linear edges in said housing.

3. The storage container as set forth in claim 1 in which said axial separation is irregular but generally in an axial direction to form complementally engaging edges in said housing.

* * * * *